2,819,158

METHOD OF ARC-MELTING TITANIUM

James H. Johnston, Niles, Ohio

No Drawing. Application August 7, 1953
Serial No. 373,067

6 Claims. (Cl. 75—10)

The invention relates generally to a method of arc-melting titanium or titanium alloys to produce a ductile metal or alloy, and more specifically to a method of removing substantially all oxygen and nitrogen from the titanium during melting.

In my prior copending application Serial No. 310,588, filed September 20, 1952, I disclosed a novel method of arc-welding titanium and titanium alloys to produce a ductile weld, and it is to be understood that, as applied to titanium, the term "arc-melting" includes arc-welding, because in each case the metal or alloy is melted by the arc in the same manner. The method of said application Serial No. 310,588 consists in maintaining a shield of inert gas around an electric arc generated between a titanium workpiece and an electrode preferably of tungsten, and feeding a volatile metal, preferably calcium, into the arc to scavenge and remove the oxygen and nitrogen contaminants present in the metal and in the arc shield.

While the method of application Serial No. 310,588 produces very satisfactory results in deoxidizing and denitriding the titanium and producing a ductile weldment, there are certain mechanical disadvantages in carrying out the method, such as the requirement of feeding calcium wire to the arc from the side or through a tubular tungsten electrode, which requires both hands of the operator, and the fact that the "Heliarc" type of welding torch employed is not as economical, fast, or as easy to operate as certain other types.

It is an object of the present invention to provide a novel method of arc-melting titanium which will overcome the foregoing disadvantages as applied to arc-welding while scavenging and removing oxygen and nitrogen contaminants.

Another object is to provide a novel method of arc-melting titanium and titanium alloys which will produce substantially pure metal or alloy as a weldment or for any other purpose.

A further object is to provide a method of arc-melting titanium and titanium alloys in which one electrode contains titanium and a metal which deoxidizes and denitrides the titanium during the melting.

These and other objects are attained by the novel method of the present invention, a preferred embodiment of which is described in detail herein by way of example. Variations in the details of the method are comprehended within the scope of the invention as defined in the appended claims.

In carrying out the present method as applied to arc-welding, a welding torch known as an automatic inert gas arc-welding torch may be employed, but the method may be performed with other types of torches as long as they produce an inert gas shield around the arc. A consumable electrode wire, consisting of titanium and calcium or one of the commercial titanium alloys such as RC 130-A or RC 130-B plus a percentage of calcium, is first prepared. Such an electrode may be made by melting the metals or alloys, or by mixing calcium chips or turnings with the titanium or titanium alloy and compressing the mixture into wire, or in any other suitable manner, but the method of making the electrode containing calcium is not part of the present invention.

The percentage of calcium in the wire electrode may vary from a very small percentage up to 5% or slightly more depending upon different melting conditions, the amount being calculated to be substantially equal to the amount of calcium necessary to remove oxygen and nitrogen contaminants plus an amount to compensate for calcium which will be lost by gas expansion during the arc-welding or melting and any amount that may be desired in the finished product.

In performing arc-welding according to my method, the welding wire containing calcium with the titanium or titanium alloy may be fed by rolls from a drum or the like into the welding torch where an arc is struck between the end of the wire and the titanium workpiece, and an inert gas shield is maintained around the arc. As the end of the consumable wire melts, the wire is constantly fed into the arc to maintain a constant arc length, which may be controlled by manual regulation or by automatic voltage or current regulating means. As the wire melts, the molten metal surrounded by a moving shield of inert gas fills in the weldment on the workpiece. Since the calcium boils at 1480° C. and titanium melts at about 1700° C., the calcium is boiled out of the wire as the titanium melts and will expand violently within and beyond the arc. Immediately outside the arc it may condense to a liquid and further out it may become a solid, while remaining relatively hot. However, calcium in gaseous, liquid or solid form is very reactive to oxygen and nitrogen, and slightly more so than is titanium, so that it combines with the oxygen and nitrogen contaminants in and around the arc and forms oxides and nitrides which are insoluble in molten titanium.

Lithium has, to a great extent, the same or similar properties as calcium in deoxidizing and denitriding titanium during arc-welding or arc-melting, and the calcium in the consumable electrode can be wholly or partly replaced by lithium. However, I prefer to use calcium because of its economy and availability. Calcium and lithium do not remove the oxygen and nitrogen in the same manner as these contaminants are removed from other metals by deoxidizers or denitriders. In the ordinary case, a deoxidizer removes oxygen from a metal down to the solubility limit of oxygen in the metal, but the solubility limit of both oxygen and nitrogen in titanium is about 12% by weight whereas it is necessary to remove the oxygen and nitrogen to below .1% in titanium to avoid embrittlement.

While the fact that calcium is slightly more reactive to oxygen and nitrogen than is titanium is of some advantage in my invention, the essential features of the ability of calcium to remove oxygen and nitrogen from titanium in distinction from other metals are the insolubility of calcium and its oxides and nitrides in titanium, and the stability of the oxides and nitrides at high temperature. Thus as the calcium boils and picks up oxygen and nitrogen, relatively large quantities of calcium can be continuously supplied to keep the reaction going, and the calcium does not combine with the titanium but instead boils out of the melt and carries the oxygen and nitrogen with it.

It may be desirable under certain conditions to add a non-reactive flux to the molten puddle of titanium in order to lower the melting point of the calcium oxide and nitride formed. An example of such a flux is calcium fluoride (fluorspar), and it would float to the side of the puddle, where it may be removed mechanically if desired.

The method of the present invention is equally applicable to the refining of titanium or titanium alloys by reducing its oxygen and nitrogen content in an arc-melting furnace. In such case the arc is struck between a consumable electrode containing titanium or titanium alloy with calcium (and/or lithium) and a molten pool on the top of a body of titanium or titanium alloy preferably contained in a water cooled crucible. The atmosphere surrounding the arc is moving inert gas, and the titanium from the electrode melts and builds up refined titanium on the titanium body, while the calcium in the electrode boils out and carries with it the oxygen and nitrogen. The atmosphere of inert gas may be under partial vacuum to help in removing calcium and lithium dusts.

In order to eliminate excess calcium from the molten titanium the ratio of the partial pressure of calcium in the melt to the partial pressure of calcium in the surrounding atmosphere should be kept as high as possible by removing condensed calcium. Since the partial pressure of calcium gas in the arc is high due to high temperature, calcium is forced into the melt under the arc but because the partial pressure of calcium over the melt is very small outside the arc due to its lowered temperature, it is pulled out of the melt in the region away from the arc. Thus there is a continuous transfer of calcium through the arc into the pool, and thence out to the surrounding atmosphere as condensed calcium.

It will be apparent that the present invention provides a novel method of arc-melting titanium in which oxygen and nitrogen contaminants are substantially entirely removed to produce refined titanium or titanium alloys, by utilizing a consumable electrode of titanium containing calcium and/or lithium in proper proportion to remove the oxygen and nitrogen from the arc.

The term "titanium" as used throughout the specification and claims is intended to include titanium metal alone, and any of its commercial alloys consisting principally of titanium, such as RC 130–A which contains 7% manganese and not over 0.2% carbon, and RC 130–B which contains 4% aluminum, 4% manganese, and not over 0.2% carbon.

What is claimed is:

1. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, and feeding the electrode into the arc to maintain a substantially constant arc length as the end of the electrode is melted, said electrode consisting principally of impure titanium and containing an amount of calcium not more than 5 per cent by weight but at least sufficient to scavenge both the pool of metal and the atmosphere within the shield to remove said contaminants therefrom as compounds of calcium insoluble in molten titanium.

2. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, and feeding the electrode into the arc to maintain a substantially constant arc length as the end of the electrode is melted, said electrode consisting principally of impure titanium and containing an amount of lithium not more than 5 percent by weight but at least sufficient to scavenge both the pool of metal and the atmosphere within the shield to remove said contaminants therefrom as compounds of lithium insoluble in molten titanium.

3. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, and feeding the electrode into the arc to maintain a substantially constant arc length as the end of the electrode is melted, said electrode consisting principally of impure titanium and containing an amount of calcium and lithium not more than 5 percent by weight but at least sufficient to scavenge both the pool of metal and the atmosphere within the shield to remove said contaminants therefrom as compounds of calcium and lithium insoluble in molten titanium.

4. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, adding a non-reactive flux to said pool and feeding the electrode into the arc to maintain a substantially constant arc length as the end of the electrode is melted, said electrode containing a major amount of impure titanium and a minor amount of calcium, the amount of calcium being at least sufficient to scavenge both the pool of metal and the atmosphere within the shield to remove said contaminants therefrom as compounds of calcium insoluble in molten titanium.

5. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, adding a non-reactive flux to said pool and feeding the electrode into the arc to maintain a substantially constant arc length as the end of the electrode is melted, said electrode containing a major amount of impure titanium and a minor amount of lithium, the amount of lithium being at least sufficient to scavenge both the pool of metal and the atmosphere within the shield to remove said contaminants therefrom as compounds of lithium insoluble in molten titanium.

6. A method of arc-melting titanium and alloys thereof to produce an ingot having a core substantially free of atmospheric contaminants such as oxygen, comprising the steps of, generating an arc between a small quantity of titanium and a consumable electrode to form a molten pool, maintaining a shield of inert gas around the arc and pool, adding a non-reactive flux to said pool and feeding the electrode into the arc to maintain a substantially constant arc length as the end of the electrode is melted, said electrode containing a major amount of impure titanium and a minor amount of calcium and lithium, the amount of calcium and lithium being at least sufficient to scavenge both the pool of metal and the atmosphere within the shield to remove said contaminants therefrom as compounds of calcium and lithium inslouble in molten titanium.

References Cited in the file of this patent

UNITED STATES PATENTS

| | | |
|---|---|---|
| 1,966,260 | Monson | July 10, 1934 |
| 2,069,906 | Vaders | Feb. 9, 1937 |
| 2,546,320 | Rostron | Mar. 27, 1951 |
| 2,576,793 | Jordan | Nov. 27, 1951 |
| 2,632,080 | Wasserman | Mar. 17, 1953 |